2,956,050
ETHYLENE POLYMERIZATION PROCESS AND CATALYST THEREFOR

Calvin J. Benning, Kensington, Md., assignor to W. R. Grace & Co., a corporation of Connecticut No Drawing. Filed Jan. 13, 1959, Ser. No. 786,658

9 Claims. (Cl. 260—94.9)

This invention relates to an ethylene polymerization process incorporating an improved preformed catalyst.

In summary this invention is directed to synthesizing solid ethylene polymers by subjecting ethylene under pressure, to the action of a preformed $TiCl_2$ catalyst with ethylene adsorbed thereon prepared by triturating or grinding $TiCl_2$ particles in an atmosphere consisting essentially of ethylene.

The essence of this invention is the adsorption on the $TiCl_2$ catalyst surface of ethylene in a grinding operation to increase catalytic activity. The $TiCl_2$ catalyst of this invention when activated in accordance with the instant disclosure has been found to be much more active than a $TiCl_2$ catalyst of comparable surface area that has not been so prepared. It appears that the freshly fractured surfaces of the ground $TiCl_2$ particles when conditioned with ethylene become extremely active sites for subsequent ethylene polymerization initiation. It also appears that the increased catalytic activity cannot be accounted for merely by an increase in the number of finer $TiCl_2$ particles nor by an increase in surface area as will be shown hereinafter. Furthermore, it appears that an adsorption of too much ethylene on the $TiCl_2$ surface decreases catalyst activity.

The reason for the increased activity is not fully known. From the results it appears that the weight of ethylene adsorbed on the $TiCl_2$ up to an amount sufficient to form a monomolecular layer on the $TiCl_2$ surface area achieves the highest activity. Greater amounts decrease activity and yield a $TiCl_2$ catalyst having an activity less than a $TiCl_2$ catalyst ball milled in an inert atmosphere.

It is obvious that the amount of ethylene adsorbable as a monomolecular layer on the $TiCl_2$ catalyst particles is dependent on the surface area of the $TiCl_2$ catalyst which in turn is a function of the grinding time. Nevertheless I have found that after extended ball milling periods i.e. about 14 days the surface area of the $TiCl_2$ particles decreases. This decrease in surface area appears to be due to the agglomeration of smaller particles by electrostatic or Van der Waals forces. However, I do not wish to be bound by any theory in regard to the increased activity of my catalyst. Suffice it to say that preforming a $TiCl_2$ catalyst by grinding in the presence of a medium consisting essentially of ethylene under conditions such that the amount of ethylene adsorbed on the $TiCl_2$ particles is not more than 4.5% of the total catalyst weight yields a catalyst with greatly increased activity for ethylene polymerization.

To insure the enhanced catalytic activity of the $TiCl_2$ pretreated in conformance with this invention it is necessary that the activated catalyst be maintained free from contact with contaminants which tend to deactivate or poison the catalyst thereby decreasing or terminating its ethylene polymerization power. Such contaminants include oxygen, moisture, carbon dioxide and the like. To preserve freedom from contaminants the activated $TiCl_2$ catalyst is transferred from the ball mill in a "dry box" maintained under a slight pressure of a gas inert to the activated catalyst. In the experiments and examples stated herein argon is used as the inert gas in the dry box, however, the other noble gases especially helium and neon and pure dry lamp-grade nitrogen are equally suitable. The transference of the activated catalyst in the dry box can be made either to an argon-purged storage vessel for later polymerization use or directly into an argon-purged polymerization reactor.

Although a ball mill was used in all examples in the specification, substantially any mechanism can be used for the grinding operation that can be maintained under pressure, free of catalyst contaminants, and which causes the individual pieces of $TiCl_2$ to break up into smaller particles and/or causes their surfaces to be cleaned or abraded. Other operable mechanisms would include a rod mill, pebble mill, jet (or colloid) mill, vibrating ball mill and the like.

The duration of the grinding step is dependent upon the efficiency of the grinding mechanism employed. In runs using a ball mill and the preferred ethylene pressure range infra the grinding should be carried on for at least 24 hours and preferably for several days, i.e. 2 to 5 or more. However, more efficient grinding mechanisms, e.g. a vibrating ball mill would allow grinding time to be decreased substantially.

Grinding the $TiCl_2$ catalyst in the presence of ethylene, is preferably, but not necessarily, performed at superatmospheric pressure e.g., up to 100 p.s.i. A preferred range of ethylene monomer pressure used in the grinding step is a superatmospheric pressure up to 50 p.s.i.

The $TiCl_2$ catalyst so prepared is useful in making high-molecular weight solid polyethylene. It is operable at polymerization temperatures ranging from 30° to 250° C. and higher, preferably 50–200° C. Also when using the catalyst of this invention, pressures in the polymerization reactor are suitably in the range of 200 to 2000 p.s.i. and even higher. Preferably, the pressure is in the range of 250 to 100 p.s.i. and for practical purposes pressures in the range 300–600 p.s.i. are adequate.

The polymerization reaction is operable with or without a liquid hydrocarbon reaction medium. If a liquid hydrocarbon reaction medium is used it should be one which is inert to the reaction, remains liquid under the polymerization conditions of temperature and pressure employed, and which is free of contaminants which retard or inhibit the polymerization reaction per se or have an adverse effect on the catalyst activity. Such contaminants include moisture, oxygen, carbon dioxide, any active hydrogen containing material and the like. A liquid hydrocarbon reaction medium in which the ethylene monomer will dissolve is preferred e.g. pentane, hexane, heptane, cyclohexane, octane, benzene, xylene, toluene, and the like.

The amount of activated $TiCl_2$ catalyst is not critical. Relatively, small amounts are adequate to form relatively large amounts of polymer. In general, a practical range is 0.001 to 1 g. of catalyst per gram of ethylene polymerized. Larger amounts of catalyst are operable but unnecessary.

The crude ethylene polymer obtained by the practice of this invention may be purified and recovered by techniques well known in the art. For example, the crude polymer may be refluxed with alcoholic acids e.g., HCl-methanol, followed by filtration and drying.

Throughout this specification it will be understood that all samples of activated $TiCl_2$ are weighed and added to the autoclave under conditions equivalent to the conditions of activation as regards freedom from deactivating contaminants.

The following examples will aid in illustrating the invention but do not limit its scope.

EXAMPLE 1

Catalyst activation in ethylene 173 g. of $TiCl_2$ (minus 20 mesh) were charged to a 750 ml. stainless steel ball mill containing seventy-five ⅜" stainless steel balls and removably connected through two needle valves to a rotatable gas cylinder. The gas cylinder (75 ml. capacity) was charged initially with 200 p.s.i.g. of ethylene, which upon the opening of the needle valves, provides about 50 p.s.i. initial ethylene pressure in the ball mill. The gas cylinder charge was released into the ball mill intermittently through the two needle valves after which the valves were closed and milling continued. After 3 days of milling, a further cylinder charge of 300 p.s.i.g. ethylene was released periodically into the ball mill through the needle valves for another day of milling. An additional cylinder charge of 400 p.s.i.g. ethylene was added intermittently on the beginning of the fifth day of milling. Following the 5 days of milling the $TiCl_2$ catalyst showed a gain of 6.3 g. of ethylene (3.5% of the total catalyst weight). The thus activated catalyst was transferred to a storage vessel under argon to be used for ethylene polymerization.

EXAMPLE 2

Polymerization of ethylene

Using precautions to insure the exclusion of contaminants from the activated catalyst, 0.97 g. of $TiCl_2$ catalyst prepared in Example 1 were charged to an argon-purged 1-liter autoclave containing 350 ml. of cyclohexane and equipped with mechanical stirrer and gas inlet. Agitation was commenced and the autoclave heated to about 138° C. and pressurized with ethylene to 450 p.s.i.g. The temperature rose quickly to about 172° C. and continued to increase during the run. After 12 minutes the reaction was stopped and the autoclave cooled and vented. The polymer product removed from the autoclave was transferred to a beaker and purified by refluxing in an alcoholic acid, i.e., HCl-methanol followed by filtration and drying. The yield of purified solid polyethylene was 31 g. The polyethylene, having a density of 0.944, had a specific viscosity of 10, which value was obtained by dissolving 0.1 g. purified polyethylene product in 100 cc. Decalin at 135° C. indicating a molecular weight of 1 to 5 millions.

Using the formula for determining catalyst activity (grams of polymer/grams of catalyst/per hour) it will be seen that this particular catalyst has an activity of:

$$\frac{31}{0.97 \times 0.2} = 160$$

EXAMPLE 3

Polymerization of ethylene

Example 2 was repeated except that less $TiCl_2$ catalyst, i.e., 0.88 g., was used. The reaction was discontinued after 20 minutes, and the autoclave cooled and vented. After purification, 40.9 g. of dried solid polyethylene product (density 0.940) were obtained. The activity of the catalyst was calculated to be 141.5.

In order to compare the catalytic activity of the instant invention with that of a $TiCl_2$ catalyst not so prepared, the following control runs were performed.

EXAMPLE 4

Polymerization using $TiCl_2$ catalyst not ball milled 0.46 g. of minus 20 mesh $TiCl_2$ catalyst that had not been ball-milled and having a surface area of 3.14 meters²/g. were charged to an argon-purged 1 liter stainless steel autoclave containing 295 ml. cyclohexane. Agitation was commenced and the autoclave heated to 140° C. and pressurized to 450 p.s.i.g. with ethylene. After 1 hour the run was discontinued and the autoclave cooled and vented. A yield of 0.65 g. solid polymer was obtained. The catalyst activity (g. polymer/g. catalyst/hour) was equal to 1.4.

EXAMPLE 5

Polymerization using $TiCl_2$ catalyst not ball milled

Using the procedure and conditions of Example 4, 1.18 g. $TiCl_2$ (minus 20 mesh) that had not been ball-milled were charged to an argon-purged 1 liter stainless steel autoclave containing 300 ml. cyclohexane. Agitation was started and the autoclave heated to 140° C. and pressurized to 450 p.s.i.g. with ethylene. After 1 hour a yield of 3 g. solid ethylene polymer resulted. The catalyst activity was therefore $$\frac{3}{1.18 \times 1} = 2.5$$

Since the yield was smaller and the amount of catalyst and the reaction time greater it is clear that ball milling in an ethylene medium gives a much more active catalyst.

EXAMPLE 6

Polymerization using $TiCl_2$ catalyst ball milled in an inert atmosphere 0.58 g. of $TiCl_2$, ball milled in an inert argon atmosphere for 5 days, was placed in a 1 liter stainless steel argon-purged autoclave containing 300 ml. cyclohexane. Agitation was started and the autoclave heated to 140° C. and pressured to 450 p.s.i.g. with ethylene. After 1 hour the run was stopped and the autoclave cooled and vented. A yield of 19.5 g. solid ethylene polymer resulted. The catalyst activity was equal to 33.6.

EXAMPLE 7

Polymerization using $TiCl_2$ catalyst ball milled in an inert atmosphere 0.98 g. $TiCl_2$, ball milled in an inert argon atmosphere for 2 days and having a surface area of 37.6 meters²/g. were charged to a 1 liter argon-purged stainless steel autoclave containing 285 ml. cyclohexane. Agitation was commenced and the autoclave heated to 140° C. and pressurized with ethylene to 450 p.s.i.g. After 1 hour the autoclave was cooled and vented and 28.0 g. of solid ethylene polymer was recovered. The catalyst activity was equal to 28.5.

Examples 2 and 3 when compared with Examples 6 and 7 show the improvement of the catalyst of the instant invention over a $TiCl_2$ catalyst merely ball-milled under an inert atmosphere.

EXAMPLE 8

Ball-milling $TiCl_2$ in excess ethylene

The procedure of Example 1 was followed except that 172 g. $TiCl_2$ (minus 20 mesh) were charged to the 750 ml. stainless steel ball mill. The ball mill was pressured to 100 p.s.i. by means of the cylinder containing ethylene at 400 p.s.i.g. During the 5 day ball milling period another charge of 400 p.s.i.g. in the cylinder was discharged into the ball mill. Following the 5 day milling period the catalyst showed a gain of 9.25 g. of ethylene (5.1% of the total catalyst weight).

EXAMPLE 9

Polymerization using ball milled $TiCl_2$ with excess ethylene adsorbed thereon 0.84 g. $TiCl_2$ from Example 8 were charged under an inert argon atmosphere to a 1 liter stainless steel autoclave equipped with stirrer and containing 305 ml. cyclohexane. Stirring was commenced and the autoclave heated to 140° C. and pressurized to 510 p.s.i.g. with ethylene. After one half hour the run was discontinued and the autoclave cooled and vented. No polymer was obtained.

EXAMPLE 10

Example 9 was repeated except that 0.93 g. $TiCl_2$ from Example 8 was charged to the autoclave. Using the same conditions of time, temperature, and pressure as in Example 9, no polymer was obtained.

Examples 9 and 10 point out the criticality of the amount of ethylene that can be adsorbed on the $TiCl_2$ to still obtain a catalyst of increased activity. Ethylene adsorption in excess of about 4.5% of the total weight of the preformed catalyst has an adverse effect on catalyst activity.

In practicing the instant invention it is also critical to add ethylene to the grinding step at a low pressure i.e. 100 p.s.i. or less and preferably at 50 p.s.i. or less. This is to insure that polymerization does not occur in the grinding step thereby covering the $TiCl_2$ particles and cushioning them against subsequent fracture. In addition it is critical to add the ethylene to the grinding step slowly as new surfaces are prepared for adsorption.

The uses of the polyolefins of this invention are analogous to those prepared by prior art procedures. The solid ethylene polymers can be used to make moldings, film filament, pipe, tubing, and the like, using substantially the same equipment and technique customary for the solid polyethylenes of the prior art.

I claim:

1. The method of forming an active $TiCl_2$ catalyst for ethylene polymerization which comprises grinding $TiCl_2$ in a medium consisting essentially of gaseous ethylene at a superatmospheric pressure up to substantially 50 p.s.i. until the $TiCl_2$ has adsorbed substantially 3.5% by weight of ethylene.

2. The method according to claim 1 in which the grinding step is performed under an ethylene pressure ranging from atmospheric to 50 p.s.i.

3. The method of forming solid polyethylene which comprises subjecting ethylene to the action of a $TiCl_2$ catalyst prepared by grinding $TiCl_2$ in a medium consisting essentially of gaseous ethylene at a superatmospheric pressure up to substantially 50 p.s.i. until the $TiCl_2$ has adsorbed substantially 3.5% by weight of ethylene.

4. The method of claim 3 in which the polymerization is carried out within the temperature range of 30° to 250° C. and within a pressure range of 200 to 2000 p.s.i.

5. The method of claim 4 in which the temperature range is 50° C. to 200° C. and the pressure range is 300 to 600 p.s.i.

6. The method according to claim 3 in which the polymerization is carried out in a liquid hydrocarbon reaction medium.

7. The method according to claim 6 in which the liquid hydrocarbon reaction medium is cyclohexane.

8. A process for producing a solid ethylene polymer which comprises contacting ethylene at a polymerization temperature between substantially 100° C. and 200° C. and a pressure in the range 400 to 600 p.s.i. with an active $TiCl_2$ catalyst prepared by grinding $TiCl_2$ in a medium consisting essentially of gaseous ethylene at a superatmospheric pressure up to substantially 50 p.s.i. until the $TiCl_2$ has adsorbed substantially 3.5% by weight of ethylene and recovering the solid ethylene polymer thus produced.

9. The method according to claim 8 wherein the catalyst to ethylene polymer weight ratio is in the range .001–1:1.

References Cited in the file of this patent

FOREIGN PATENTS

| 538,782 | Belgium | Dec. 6, 1955 |
| 778,639 | Great Britain | July 10, 1957 |
| 787,375 | Great Britain | Dec. 4, 1957 |

OTHER REFERENCES

Stille: Chem. Rev., vol. 58, No. 3, June 1958 (pages 565–567).

Emmett: Catalysis, vol. 1, page 1, Reinhold Publishing Corporation (New York—1954).

UNITED STATES PATENT OFFICE
CERTIFICATE OF CORRECTION

Patent No. 2,956,050            October 11, 1960

Calvin J. Benning

It is hereby certified that error appears in the printed specification of the above numbered patent requiring correction and that the said Letters Patent should read as corrected below.

Column 2, line 39, for "100 p.s.i." read -- 1000 p.s.i. --; column 4, line 71, for "Ticl$_2$" read -- TiCl$_2$ --.

Signed and sealed this 25th day of April 1961.

(SEAL)
Attest:
ERNEST W. SWIDER
Attesting Officer

DAVID L. LADD
Commissioner of Patents